United States Patent
Zhang et al.

(10) Patent No.: US 9,246,640 B2
(45) Date of Patent: Jan. 26, 2016

(54) ACKNOWLEDGEMENT BUNDLING IN A MIMO COMMUNICATION SYSTEM

(75) Inventors: Xiaoxia Zhang, San Diego, CA (US); Wanshi Chen, San Diego, CA (US); Xiliang Luo, Northridge, CA (US); Tao Luo, San Diego, CA (US); Hao Xu, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 13/078,791

(22) Filed: Apr. 1, 2011

(65) Prior Publication Data

US 2012/0093094 A1 Apr. 19, 2012

Related U.S. Application Data

(60) Provisional application No. 61/321,057, filed on Apr. 5, 2010, provisional application No. 61/389,549, filed on Oct. 4, 2010.

(51) Int. Cl.
*H04L 1/18* (2006.01)
*H04L 1/00* (2006.01)

(52) U.S. Cl.
CPC ............ *H04L 1/1867* (2013.01); *H04L 1/0079* (2013.01); *H04L 1/1887* (2013.01)

(58) Field of Classification Search
CPC ........................... H04L 5/0053; H04L 5/0055
USPC .................................................. 370/229–339
See application file for complete search history.

(56) References Cited

U.S. PATENT DOCUMENTS

| | | | |
|---|---|---|---|
| 2008/0192674 A1* | 8/2008 | Wang et al. | 370/315 |
| 2009/0238131 A1* | 9/2009 | Montojo et al. | 370/329 |
| 2009/0262856 A1* | 10/2009 | Onggosanusi et al. | 375/267 |
| 2009/0279460 A1* | 11/2009 | Sarkar | 370/280 |
| 2010/0074208 A1 | 3/2010 | Farajidana et al. | |
| 2010/0115358 A1* | 5/2010 | Kotecha | H04L 1/1812 714/748 |
| 2010/0215109 A1 | 8/2010 | Onggosanusi et al. | |
| 2011/0176637 A1* | 7/2011 | Hu et al. | 375/316 |
| 2011/0206014 A1* | 8/2011 | Lee et al. | 370/335 |
| 2012/0147815 A1* | 6/2012 | Meyer et al. | 370/328 |

FOREIGN PATENT DOCUMENTS

| | | |
|---|---|---|
| CN | 101646237 A | 2/2010 |
| JP | 2010534996 A | 11/2010 |
| JP | 2011517515 A | 6/2011 |

(Continued)

OTHER PUBLICATIONS

Texas Instruments, Layer Mapping Solution for Uplink SU-MIMO, R1-090589, 3GPP TSG RAN WG1 #56, Athens, Greece, Feb. 9-13, 2009, pp. 1-4.*

(Continued)

*Primary Examiner* — Benjamin Lamont
(74) *Attorney, Agent, or Firm* — Liem T. Do

(57) ABSTRACT

A method of wireless communication comprises receiving a plurality of codewords and transmitting a downlink feedback message by spatially bundling acknowledgments for the received plurality of codewords. In some designs, an accompanying grant message is transmitted with the downlink feedback message.

32 Claims, 9 Drawing Sheets

(56) References Cited

FOREIGN PATENT DOCUMENTS

| JP | 2011172053 A | 9/2011 |
|---|---|---|
| JP | 2012503453 A | 2/2012 |
| WO | WO-2009064059 A1 | 5/2009 |
| WO | WO-2009113836 A1 | 9/2009 |
| WO | WO-2009137646 A2 | 11/2009 |
| WO | WO-2010034012 | 3/2010 |
| WO | WO-2010036156 A1 | 4/2010 |

OTHER PUBLICATIONS

Alcatel-Lucent Shanghai Bell, Alcatel-Lucent: "HARQ Bundling with Layer Shifting for LTE-Advanced Uplink SU-MIMO", 3GPP TSG RAN WGI Meeting #58BIS, R1-093785, Oct. 12, 2009, pp. 1-5, XP000002657407, Miyazaki, Japan Retrieved from the Internet: URL:http://ftp.3gpp.org/ftp/tsg_ran/WGI_RL1/TSGRI_58b/Docs/R1-93785.zip>.

International Search Report and Written Opinion—PCT/US2011/031302, ISA/EPO—Aug. 31, 2011.

Nokia et al., "Acknowledgement for explicit UL SPS release in LTE Rel 9", 3GPP Draft; R1-093894, 3rd Generation Partnership Project (3GPP), Mobile Competence Centre; 650, Route des Lucioles; F-06921 Sophia-Antipolis Cedex; France, no. Miyazaki; Oct. 12, 2009, XP050388398, [retrieved on Oct. 5, 2009].

NTT Docomo: "Investigation of Layer Shifting and HARQ Spatial Bundling for UL SUMIMO", 3GPP Draft; R1-101655 Layer Shifting for UL SU-MIMO Rev, 3rd Generation Partnership Project (3GPP), Mobile Competence Centre ; 650,.Route des Lucioles ; F-06921 Sophia-Antipolis Cedex ; France, vol . RAN WG1, no. San Francisco, USA; Mar. 1, 2010, XP050419101, [retrieved on Mar. 1, 2010] Section 3.

NTT Docomo et al., "Impact of HARQ Spatial Bundling to Support UL SU-MIMO", 3GPP Draft; R1-102303 HARQ Operation for UL SU-MIMO, 3rd Generation Partnership Project (3GPP), Mobile Competence Centre ; 650, Route des Lucioles; F-06921 Sophia-Antipolis Cedex; France, vol. RAN WGI, no. Beijing, china; Apr. 12, 2010, Apr. 6, 2010, XP050419544, [retrieved on Apr. 6, 2010].

Partial International Search Report—PCT/US2011/031302—ISA/EPO—Jul. 18, 2011.

QUALCOMM Inc: "DL ACK for UL MIMO operation", 3GPP Draft; R1-102337 DL ACK for UL MIMO Operation, 3rd Generation Partnership Project (3GPP), Mobile Competence Centre; 650, Route des Lucioles; F-06921 Sophia-Antipolis Cedex; France, vol. RAN WGI, no. Beijing, china; Apr. 12, 2010, Apr. 6, 2010, XP050419566, [retrieved on Apr. 6, 2010].

Samsung: "HARQ handling in UL MIMO" 1-48 3GPP Draft; RI-102209 ULHARQ, 3rd Generation Partnership Project (3GPP), Mobile Competence Centre ; 650, Route des Lucioles ; F-06921 Sophia-Antipolis Cedex ; France, vol. RAN WG1, no. Beijing, china; Apr. 12, 2010, Apr. 6, 2010, XP050419481.

Texas Instruments: "Further-Analysis on Uplink SU-MIMO for E-UTRA", 3GPP Draft; R1-090486 T I UL SUMIMO Updated, 3rd Generation Partnership Project (3GPP), Mobile Competence Centre ; 650, Route des Lucioles ; F-06921 Sophia-Antipolis Cedex ; France, no. Ljubljana; Jan. 19, 2009, XP050318378, [retrieved on 2009-01-191 Section 1, 3.3 and 3.4.

Texas Instruments: "MCS and HARQ Bundling for Uplink SU-MIMO", 3GPP Draft; R1-091299 TI UL MIMO MCS AN, 3rd Generation Partnership Project (3GPP), Mobile Competence Centre; 650, Route des Lucioles; F-06921 Sophia-Antipolis Cedex; France, no. Seoul, Korea; Mar. 18, 2009, XP050338906, [retrieved on Mar. 18, 2009].

Texas Instruments: "Layer Mapping 1-48 Solution for Uplink SU-MIMO" 3GPP Draft; RI-090589 TI UL MIMO Layer, 3rd Generation Partnership Project (3GPP), Mobile Competence Centre ; 650, Route des Lucioles ; F-06921 Sophia-Antipolis Cedex ; France, no. Athens, Greece; Feb. 3, 2009, XP050318478.

\* cited by examiner

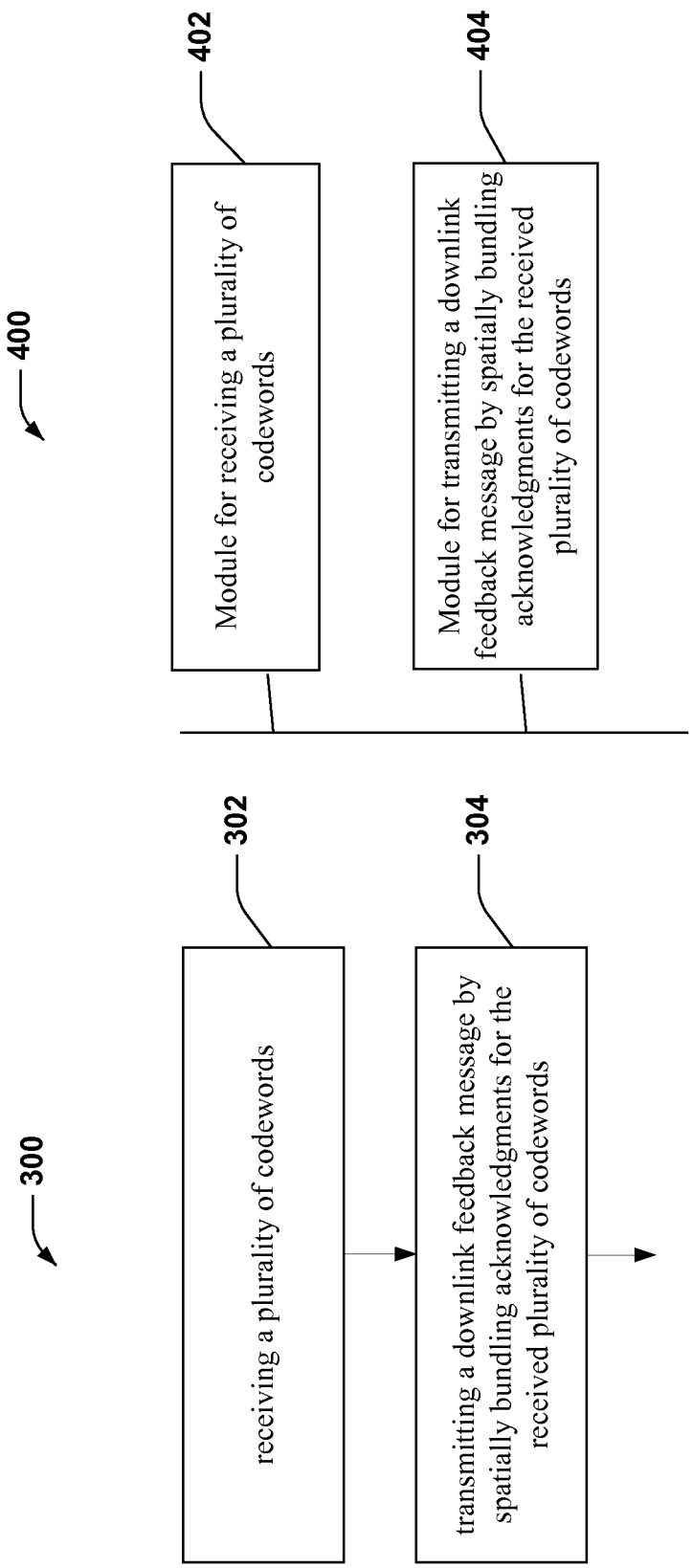

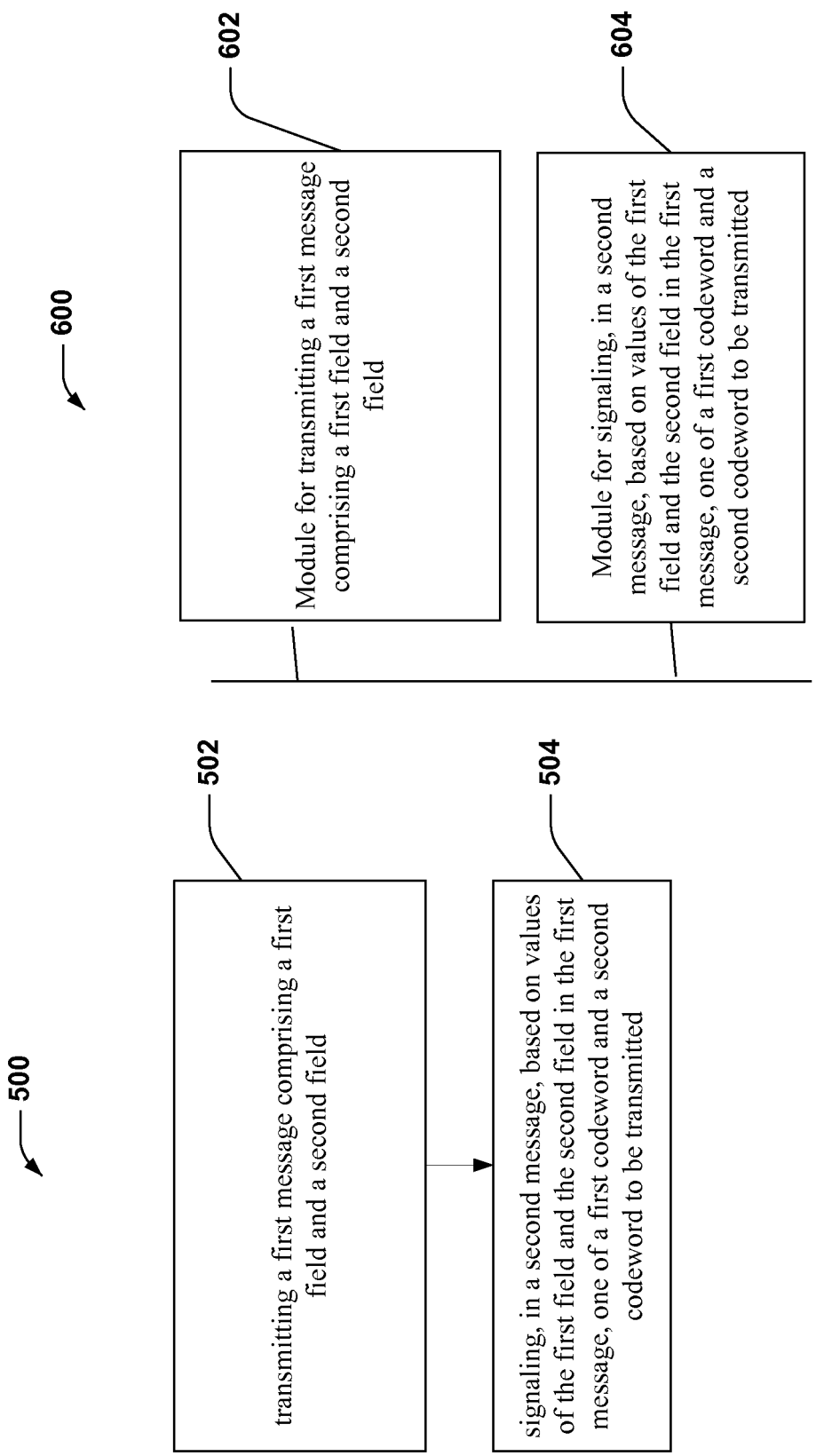

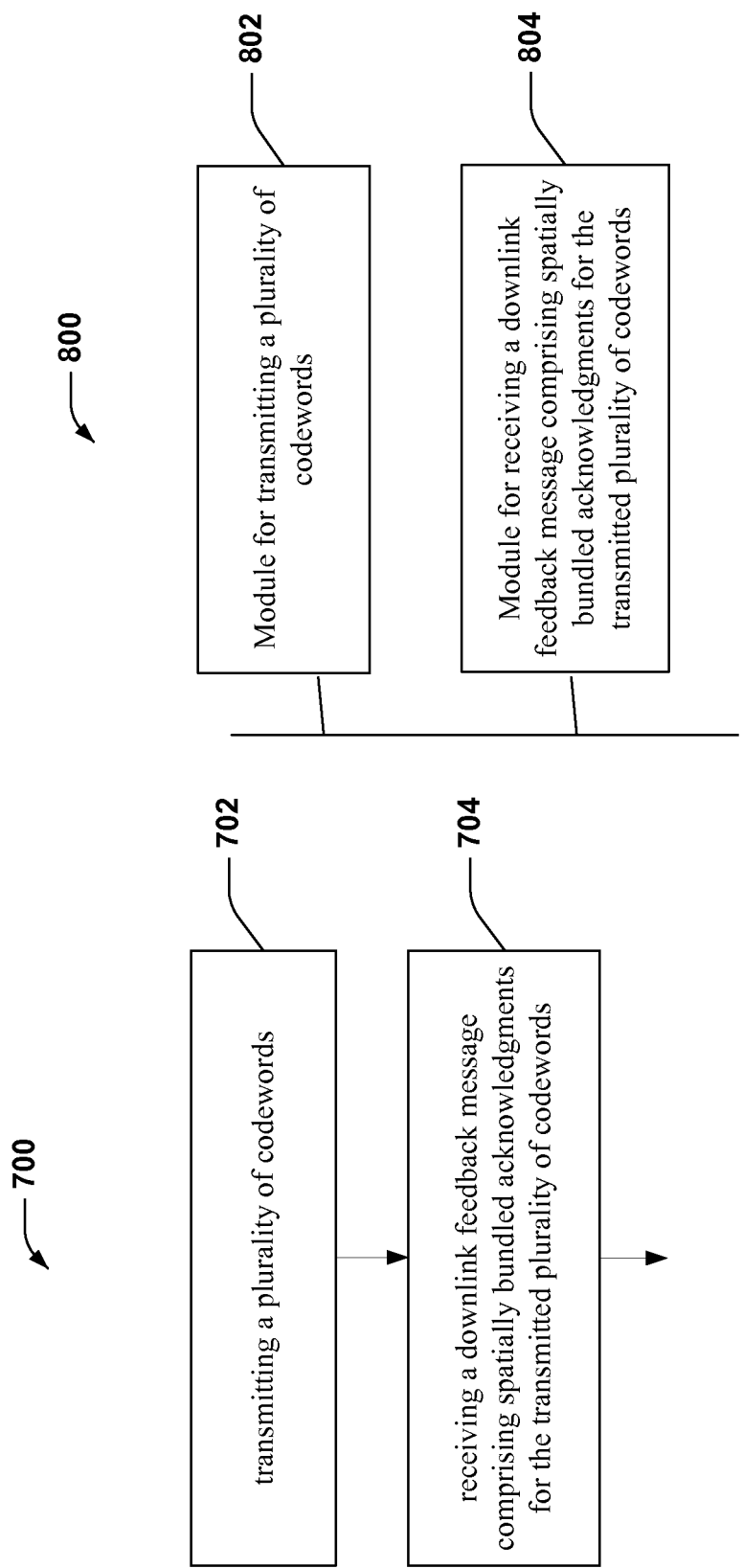

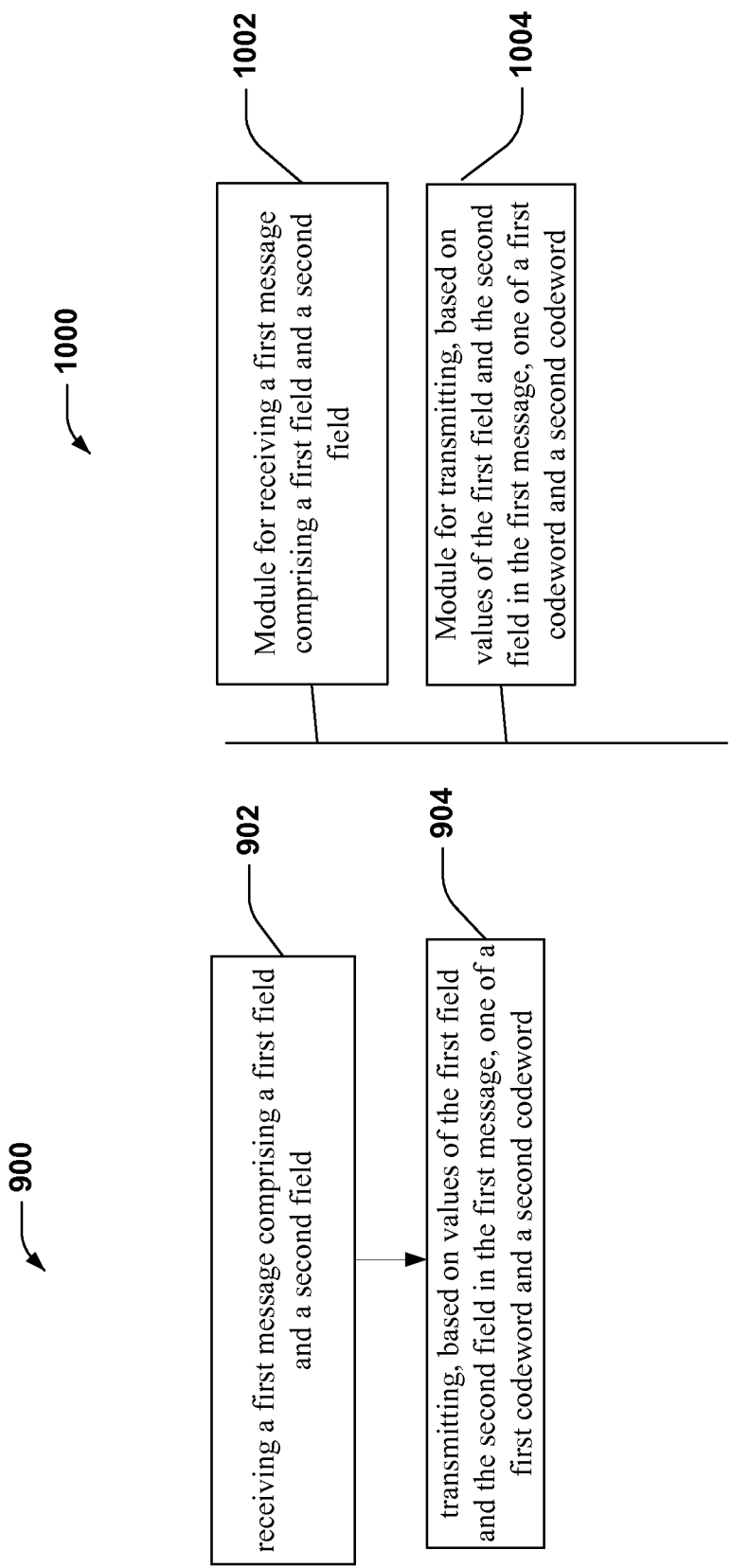

ACKNOWLEDGEMENT BUNDLING IN A MIMO COMMUNICATION SYSTEM

CROSS-REFERENCE TO RELATED APPLICATIONS

This application claims the benefit of priority from U.S. Provisional Patent Application Ser. No. 61/321,057, entitled "METHOD AND APPARATUS THAT FACILITATES ACKNOWLEDGEMENT BUNDLING FOR UPLINK MULTIPLE-IN-MULTIPLE-OUT WIRELESS COMMUNICATION SYSTEMS," filed on Apr. 5, 2010 and U.S. Provisional Patent Application Ser. No. 61/389,549, entitled "COMPACT DOWNLINK CONTROL CHANNEL FORMAT FOR UPLINK MIMO SCHEDULING," filed on Oct. 4, 2010, each of which is herein incorporated by reference in its entirety.

BACKGROUND

I. Field

The following description relates generally to wireless communications, and more particularly to the use of channel state information reference signals in a wireless communication system.

II. Relevant Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and the reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In addition, a base station or a wireless terminal can transmit reference signals to maintain or improve performance of the wireless system. Reference signals are typically signals known a priori to a receiver. A receiving device may receive reference signals and based on the received reference signals may alter certain operational parameters or generate feedback to alter certain operational parameters of wireless communication. While reference signals may thus be useful, the transmission of reference signals may take bandwidth away from other useful signals such as data or control signals. With the increase in the demand on wireless data bandwidth, there is a greater demand on efficient use of existing reference signals. Furthermore, the assignment of transmission resources to new reference signals may possibly reduce the transmission resources available to pre-existing reference signals or data signals. Furthermore, new reference signals may be transmitted using transmission resources in which legacy user equipment may be expecting data transmissions.

SUMMARY

The systems and methods provided in this disclosure meet the above discussed needs, and others. Briefly and in general terms, the disclosed designs, in one aspect, perform techniques for spatially bundling, for transmitting in downlink direction, acknowledgments for a plurality of codewords received in the uplink direction. In some disclosed designs, an accompanying uplink grant message is transmitted in the downlink direction.

The following presents a simplified summary of one or more embodiments in order to provide a basic understanding of such techniques and embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In one exemplary aspect, a method for wireless communication comprises receiving a plurality of codewords and transmitting a downlink feedback message by spatially bundling acknowledgments for the received plurality of codewords.

In another exemplary aspect, an apparatus for wireless communication comprises means for receiving a plurality of codewords and means for transmitting a downlink feedback message by spatially bundling acknowledgments for the received plurality of codewords.

In yet another exemplary aspect, a computer program product comprising a computer-readable non-volatile medium storing computer-executable instructions is disclosed. The instructions comprise code for receiving a plurality of codewords and transmitting a downlink feedback message by spatially bundling acknowledgments for the received plurality of codewords.

In yet another exemplary aspect, a wireless communication processor is disclosed. The wireless processor is configured to perform the operations of receiving a plurality of codewords and transmitting a downlink feedback message by spatially bundling acknowledgments for the received plurality of codewords.

In yet another exemplary aspect, a method of allocating transmission resources in a wireless communication system includes transmitting a first message including a first field and a second field and signaling, in a second message, based on values of the first field and the second field in the first message, one of a first codeword and a second codeword to be transmitted.

In yet another exemplary aspect, an apparatus for wireless communication includes means for allocating transmission resources in a wireless communication system includes transmitting a first message including a first field and a second field and means for signaling, in a second message, based on values of the first field and the second field in the first message, one of a first codeword and a second codeword to be transmitted.

In yet another exemplary aspect, a computer program product comprising a non-volatile computer-readable medium storing computer-executable instructions is disclosed. The instructions comprise code for transmitting a first message including a first field and a second field and signaling, in a second message, based on values of the first field and the second field in the first message, one of a first codeword and a second codeword to be transmitted.

It yet another exemplary aspect, a processor for allocating transmission resources in a wireless communication system is disclosed. The processor is configured to transmit a first message including a first field and a second field and signal, in a second message, based on values of the first field and the second field in the first message, one of a first codeword and a second codeword to be transmitted.

In yet another exemplary aspect, a method of wireless communication includes transmitting a plurality of codewords and receiving a downlink feedback message including spatially bundled acknowledgments for the transmitted plurality of codewords.

In yet another exemplary aspect, a wireless communication apparatus comprises means for transmitting a plurality of codewords and means for receiving a downlink feedback message including spatially bundled acknowledgments for the transmitted plurality of codewords.

In yet another exemplary aspect, a computer program product comprises a computer-readable non-volatile medium storing computer-executable instructions is disclosed. The instructions comprise code for transmitting a plurality of codewords and receiving a downlink feedback message including spatially bundled acknowledgments for the transmitted plurality of codewords.

In yet another exemplary aspect, a wireless communication processor is disclosed. The wireless processor is configured to perform the operations of transmitting a plurality of codewords and receiving a downlink feedback message including spatially bundled acknowledgments for the transmitted plurality of codewords.

In yet another exemplary aspect, a method of wireless communication includes receiving a first message including a first field and a second field and transmitting, based on values of the first field and the second field in the first message, one of a first codeword and a second codeword.

In yet another exemplary aspect, a wireless communication apparatus comprises means for receiving a first message including a first field and a second field and transmitting, based on values of the first field and the second field in the first message, one of a first codeword and a second codeword.

In yet another exemplary aspect, a computer program product comprises a computer-readable non-volatile medium storing computer-executable instructions is disclosed. The instructions comprise code for receiving a first message including a first field and a second field and transmitting, based on values of the first field and the second field in the first message, one of a first codeword and a second codeword.

In yet another exemplary aspect, a wireless communication processor is disclosed. The wireless processor is configured to perform the operations of receiving a first message including a first field and a second field and transmitting, based on values of the first field and the second field in the first message, one of a first codeword and a second codeword.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 3 is a flow chart representation of a process for wireless communication.

FIG. 4 is a block diagram representation of a portion of a wireless communication apparatus.

FIG. 5 is a flow chart representation of a process for wireless communication.

FIG. 6 is a block diagram representation of a portion of a wireless communication apparatus.

FIG. 7 is a flow chart representation of a process for wireless communication.

FIG. 8 is a block diagram representation of a portion of a wireless communication apparatus.

FIG. 9 is a flow chart representation of a process for wireless communication.

FIG. 10 is a block diagram representation of a portion of a wireless communication apparatus.

DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA) utilizes single carrier modulation and frequency domain equalization. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently used for uplink multiple access scheme in 3GPP Long Term Evolution (LTE), or Evolved UTRA.

It should be noted that for clarity, the subject matter below is discussed with respect to specific examples of certain signals and message formats used in LTE. However, the applicability of the disclosed techniques to other communication systems and other signal transmission/reception technology will be appreciated by one of skill in the art.

Figure 1:
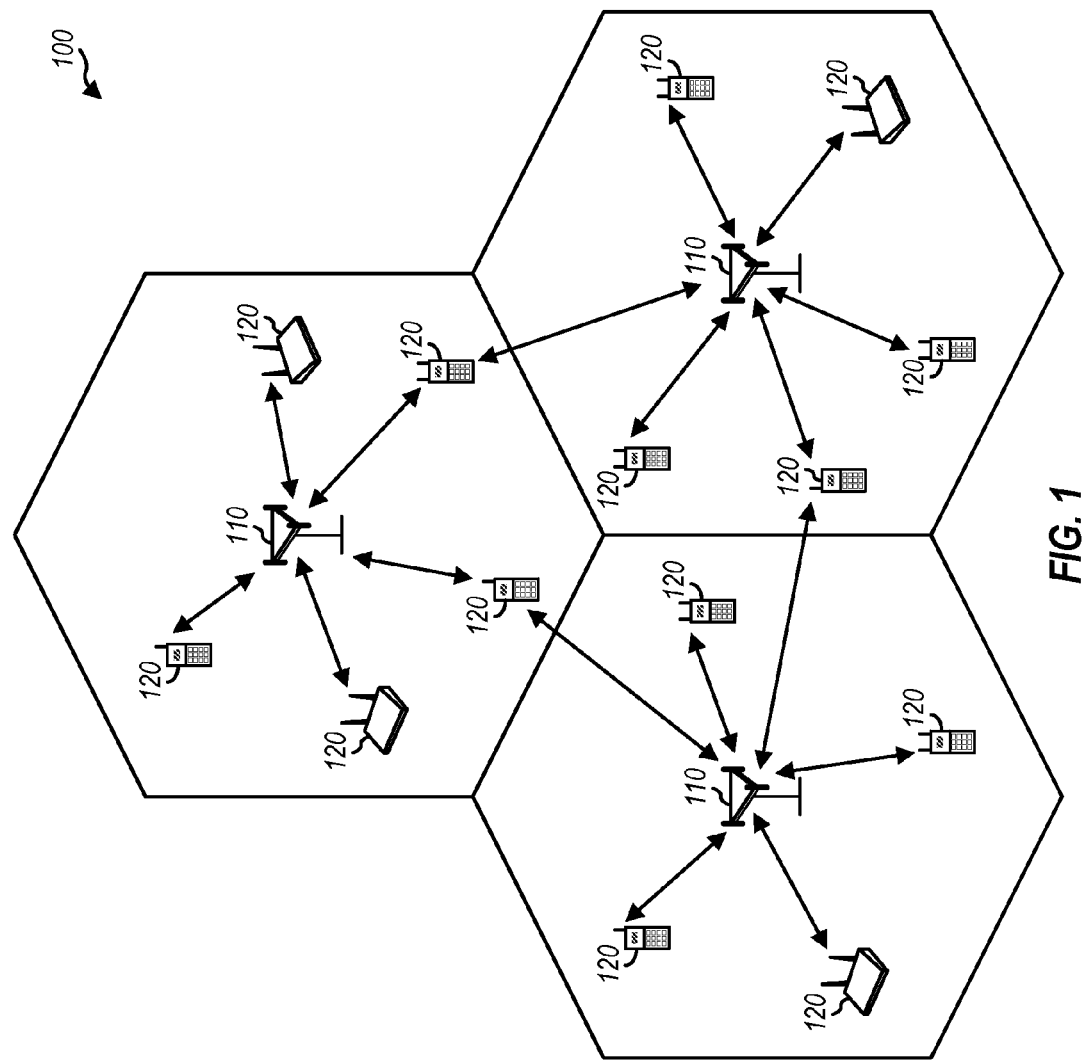
FIG. 1 illustrates a multiple access wireless communication system according to one embodiment.

FIG. 1 shows a wireless communication system 100, which may be an LTE system or some other system. System 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the user equipments (UEs) located within the coverage area. To improve capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB 110 and/or an eNB subsystem serving this coverage area.

UEs 120 may be dispersed throughout the system, and each UE 120 may be stationary or mobile. A UE may also be referred to as a mobile station, a terminal, an access terminal, a subscriber unit, a station, etc. A UE 120 may be a cellular phone, a personal digital assistant (PDA), a wireless modem, a wireless communication device, a handheld device, a laptop computer, a cordless phone, a wireless local loop (WLL) station, a smart phone, a netbook, a smartbook, a tablet, etc.

LTE utilizes orthogonal frequency division multiplexing (OFDM) on the downlink and single-carrier frequency division multiplexing (SC-FDM) on the uplink. OFDM and SC-FDM partition a frequency range into multiple ($K_s$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($K_s$) may be dependent on the system bandwidth. For example, $K_s$ may be equal to 128, 256, 512, 1024 or 2048 for system bandwidth of 1.4, 3, 5, 10 or 20 mega-Hertz (MHz), respectively. The system bandwidth may correspond to a subset of the $K_s$ total subcarriers.

Figure 2:
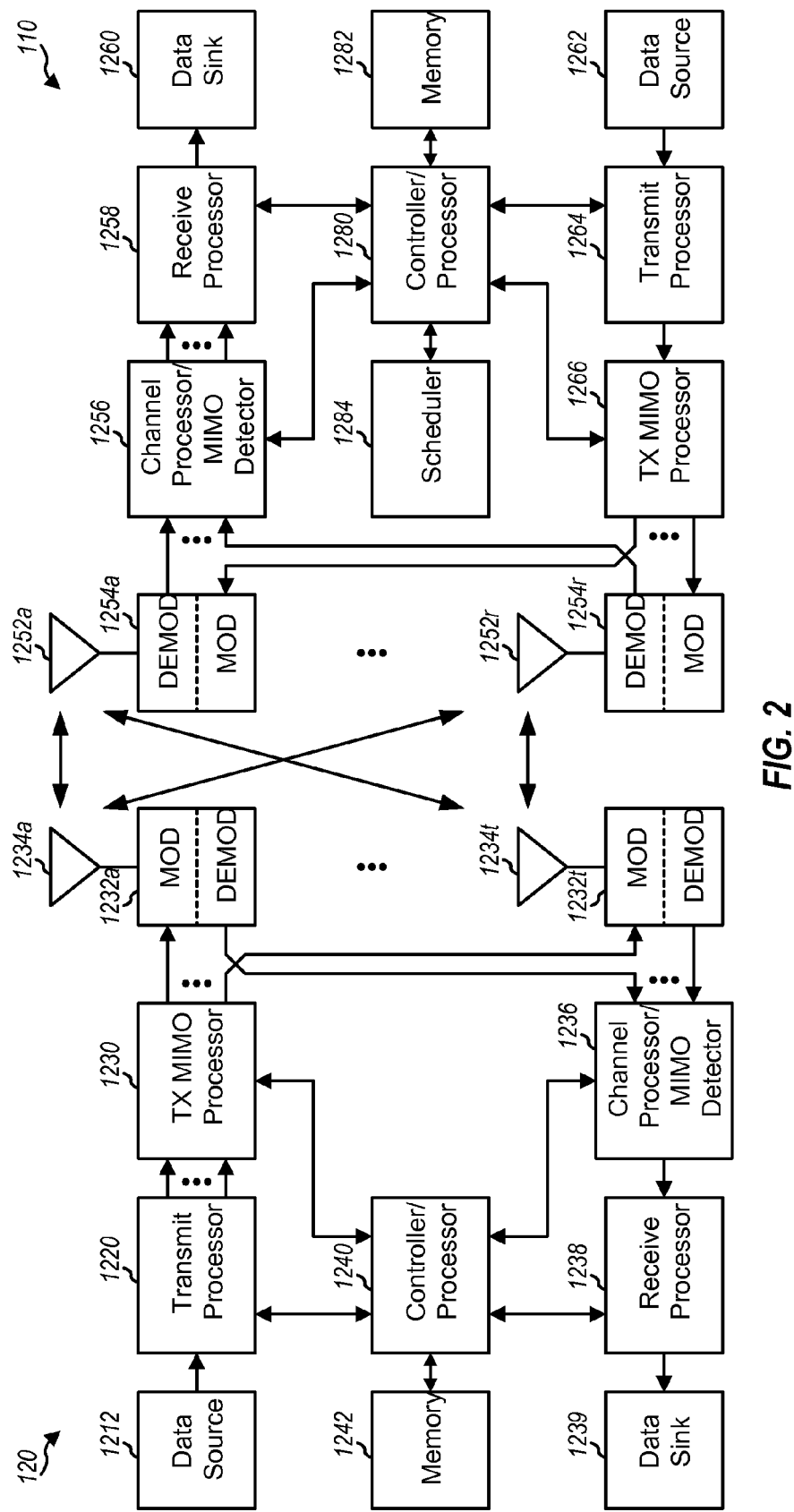
FIG. 2 illustrates a block diagram of a communication system.

FIG. 2 shows a block diagram of an exemplary base station/eNB 110 and a UE 120, which may be one of the eNBs and one of the UEs in FIG. 1. A UE 120 may be equipped with T antennas 1234a through 1234t, and base station 110 may be equipped with R antennas 1252a through 1252r, where in general T≥1 and R≥1.

At UE 120, a transmit processor 1220 may receive data from a data source 1212 and control information from a controller/processor 1240. Transmit processor 1220 may process (e.g., encode, interleave, and symbol map) the data and control information and may provide data symbols and control symbols, respectively. Transmit processor 1220 may also generate one or more demodulation reference signals for multiple non-contiguous clusters based on one or more RS sequences assigned to UE 120 and may provide reference symbols. A transmit (TX) multiple-input multiple-output (MIMO) processor 1230 may perform spatial processing (e.g., precoding) on the data symbols, the control symbols, and/or the reference symbols from transmit processor 1220, if applicable, and may provide T output symbol streams to T modulators (MODs) 1232a through 1232t. Each modulator 1232 may process a respective output symbol stream (e.g., for SC-FDMA, OFDM, etc.) to obtain an output sample stream. Each modulator 1232 may further process (e.g., convert to analog, amplify, filter, and upconvert) the output sample stream to obtain an uplink signal. T uplink signals from modulators 1232a through 1232t may be transmitted via T antennas 1234a through 1234t, respectively.

At base station 110, antennas 1252a through 1252r may receive the uplink signals from UE 120 and provide received signals to demodulators (DEMODs) 1254a through 1254r, respectively. Each demodulator 1254 may condition (e.g., filter, amplify, downconvert, and digitize) a respective received signal to obtain received samples. Each demodulator 1254 may further process the received samples to obtain received symbols. A channel processor/MIMO detector 1256 may obtain received symbols from all R demodulators 1254a through 1254r. Channel processor 1256 may derive a channel estimate for a wireless channel from UE 120 to base station 110 based on the demodulation reference signals received from UE 120. MIMO detector 1256 may perform MIMO detection/demodulation on the received symbols based on the channel estimate and may provide detected symbols. A receive processor 1258 may process (e.g., symbol demap, deinterleave, and decode) the detected symbols, provide decoded data to a data sink 1260, and provide decoded control information to a controller/processor 1280.

On the downlink, at base station 110, data from a data source 1262 and control information from controller/processor 1280 may be processed by a transmit processor 1264, precoded by a TX MIMO processor 1266 if applicable, conditioned by modulators 1254a through 1254r, and transmitted to UE 120. At UE 120, the downlink signals from base station 110 may be received by antennas 1234, conditioned by demodulators 1232, processed by a channel estimator/MIMO detector 1236, and further processed by a receive processor 1238 to obtain the data and control information sent to UE 120. Processor 1238 may provide the decoded data to a data sink 1239 and the decoded control information to controller/processor 1240.

Controllers/processors 1240 and 1280 may direct the operation at UE 120 and base station 110, respectively. Processor 1220, processor 1240, and/or other processors and modules at UE 120 may perform or direct process 700 in FIG. 7, process 900 in FIG. 9 and/or other processes for the techniques described herein. Processor 1256, processor 1280, and/or other processors and modules at base station 110 may perform or direct process 300 in FIG. 3, process 500 in FIG. 5 and/or other processes for the techniques described herein. Memories 1242 and 1282 may store data and program codes for UE 120 and base station 110, respectively. A scheduler 1284 may schedule UEs for downlink and/or uplink transmission and may provide allocations of resources (e.g., assignment of multiple non-contiguous clusters, RS sequences for demodulation reference signals, etc.) for the scheduled UEs.

The aspects disclosed herein are generally directed towards facilitating acknowledgment (ACK) and negative acknowledgment (NAK) bundling for uplink MIMO systems. Exemplary embodiments are disclosed in which different designs are provided for DL ACKing/NAKing the UL MIMO transmissions. In an aspect, desirable designs are disclosed wherein ACK bundling require less Physical Hybrid Automatic Repeat Request (HARQ) Indicator Channel (PHICH) resources, which avoid the need to have two new data indicators (NDIs) in the compact (i.e., non-MIMO) UL grant which schedules one codeword. For example, DCI format 0 is a compact (non-MIMO) DCI format in LTE Rel-8, 9 and 10.

Advances in digital communication has led to the use of multiple transmission antennas on UE 120. For example, in LTE Release 10, a single user multiple-in-multiple-out (SU-MIMO) mode is defined, in which, a UE 120 may transmit up to two transport blocks (TBs) to the eNB 110. TBs are also sometimes called codewords (CWs), although sometimes the mapping from TBs to CWs may follow a permutation, such as swapping two TBs mapped to a pair of CWs. In conventional systems, where the UE 120 transmitted zero or one TB in the uplink direction, a feedback mechanism was provided by which the eNB 110 could acknowledge whether or not the TB was received in the uplink direction from the UE 120. However, in SU-MIMO, it may be desirable, for example, for reducing communication inefficiency or for reduced complexity, to use a mechanism by which the eNB 110 on the receiving side and the UE 120 on the transmitting side share knowledge of how many and what type (e.g., new or retransmitted) of TBs are to be transmitted (or were received) over the uplink channel. In some designs, multiple mechanisms may be available to the eNB 110 for providing feedback regarding which TBs were received and for specifying which TBs should the UE 120 transmit at the next transmission opportunity (e.g., in an UL grant).

In LTE Rel-10 UL MIMO operation, there is a one-to-one mapping of transmitted TBs to CWs; there is no spatial bundling of UL grant HARQ parameters (e.g., new data indicator (NDI) and redundancy version (RV)) across two TBs. For physical hybrid ARQ indicator channel (PHICH) operation, there may be two options, a one PHICH resource design option and a two PHICH resource design option. A one PHICH resource design utilizes less PHICH overhead, and requires no change to LTE Rel-8 PHICH designs. With respect to a two PHICH resource design, it is noted that a larger PHICH overhead is utilized (i.e., less users may be supported when users are in SU-MIMO mode).

In some designs, a feedback scheme may be used in which two PHICH resources are available for ACKing/NAKing the two codewords in UL MIMO. In an aspect, such designs may include the following exemplary attributes described below. For feedback (1, 1) on PHICH, i.e., when eNB 110 indicates to the UE 120 that both the codewords were received, assuming no accompanying UL grant, the UE 120 may suspend the current transmission of codewords. For feedback (0, 0) on PHICH, i.e., when the eNB 110 indicates that both the previously transmitted codewords were not received, with no accompanying UL grant, the UE 120 may re-transmit both codewords according to the grant information for the initial transmission. For feedback (1, 0) or (0, 1) on PHICH, with no accompanying UL grant, the UE 120 may re-transmit the corresponding outstanding codeword. In one aspect, although blanking loss is envisioned, no redundant transmission of the successful codeword may be performed, hence no interference to the outstanding codeword may occur.

For feedback (1, 0) or (0, 1) on PHICH, with an accompanying UL grant with compact (non-MIMO) DCI format supporting scheduling of one codeword, the UE 120 may re-transmit the NAK-ed codeword according to the new grant information. In some designs, a PHICH transmission may be needed for the UE 120 to determine which codeword to transmit (or re-transmit). For feedback (0, 0), (0, 1), (1, 0), or (1, 1) on PHICH, and when there is an accompanying UL grant with a large payload (MIMO) DCI format, i.e., a DCI format supporting scheduling of two codewords, two NDI bits may be provided by the eNB 110 in the grant signal to indicate whether it is a new transmission or a re-transmission. Note that DCI format 4 is a large payload (MIMO) DCI format in LTE Rel-10. The UE 120 may (re-)transmit the codeword(s) according to the new grant information. It may not be necessary in this case to also provide a PHICH transmission as all the information is conveyed in the new grant.

In another aspect, feedback design schemes are also contemplated with respect to having one PHICH resource for ACKing/NAKing the two codewords in UL MIMO.

In a first exemplary feedback design scheme, the following attributes are included. For feedback 1 on PHICH (with no accompanying UL grant), the UE suspends the current transmission. For feedback 0 on PHICH (with no accompanying UL grant), the UE re-transmits both codewords according to the grant information for the initial transmission (note: in case one codeword terminates and the other one fails, there is both blanking loss and the excessive interference from the terminated codeword). For feedback 0 or 1 on PHICH (plus UL grant with a large payload DCI format supporting scheduling of two codewords), two NDIs in the UL grant signal whether it is a new transmission or re-transmission, and the UE performs (re-)transmission according to the UL grant (note: in this case, PHICH transmission is not necessary as all the information is conveyed in the new grant). For feedback 0 on PHICH (plus UL grant with compact DCI format supporting scheduling of one codeword), the UE re-transmits codeword 0 according to the grant (note: 0 on PHICH can stand for codeword 1 as well; also, in this case, PHICH transmission is necessary for the UE to determine which codeword to retransmit). For feedback 1 on PHICH (plus UL grant with compact DCI format supporting scheduling of one codeword), the UE re-transmits codeword 1 according to the grant (note: 1 on PHICH can stand for codeword 0 as well; also, in this case, PHICH transmission is necessary for UE to determine which codeword to retransmit). For an UL grant with compact DCI format supporting scheduling of one codeword only (i.e., no PHICH), the UE re-transmits codeword 0 or codeword 1 according to a fixed rule, and the UE suspends the other codeword.

A second exemplary feedback design scheme is also contemplated with respect to having one PHICH resource for ACKing/NAKing the two codewords in UL MIMO. For such feedback design scheme, the following attributes are included. For feedback 1 on PHICH (with no accompanying UL grant), the UE suspends the current transmission. For feedback 0 on PHICH (with no accompanying UL grant), the UE re-transmits both codewords according to the grant information for the initial transmission. For feedback 0 or 1 on PHICH (plus UL grant with a large payload DCI format supporting scheduling of two codewords), two NDIs in the UL grant signal whether it is a new transmission or re-transmission, and the UE performs (re-)transmission according to the UL grant (note: in this case, PHICH transmission is not necessary as all the information is conveyed in the new grant). For feedback 0 or 1 on PHICH (plus UL grant with new compact DCI format supporting scheduling of one codeword), the DCI format should have a field/hypothesis that identifies which codeword is scheduled, wherein the UE (re-)transmits the designated codeword according to the grant, and wherein the UE suspends the other codeword (note: in this case, PHICH transmission is not necessary as all the information is conveyed in the new grant).

FIG. 3 is a flow chart representation of a wireless communication methodology 300. At box 302, a plurality of codewords are received. For example, as explained above, in LTE Rel-10 two codewords may be received by the eNB 110 from the UE 120. At box 304, a downlink feedback message is transmitted by spatially bundling acknowledgements for the received plurality of codewords. In some designs, the spatially bundled acknowledgements may be transmitted in a PHICH, as explained above. In some designs, an accompanying uplink grant message may also be transmitted. The uplink grant message may comprise a MIMO DCI message. In some designs, the uplink grant message may comprise a compact format, e.g., a single TB grant DCI message. In some designs, configuration data to configure the UE 120 to provide feedback response may also be transmitted. The configuration data may include, for example, information related to the mode of operation (e.g., whether compact or large payload format for uplink grants may be used, and so on).

FIG. 4 is a block diagram representation of a portion of a wireless communication apparatus 400. The module 402 is provided for receiving a plurality of codewords. The module 404 is provided for transmitting a downlink feedback message by spatially bundling acknowledgements for the received plurality of codewords. The communication apparatus 400, the module 402 and the module 404 may further be configured to implement other functions and features discussed herein.

As previously discussed, for UL data transmission in LTE, HARQ schemes are utilized, involving data retransmission. In LTE, two types of UL data re-transmission defined: adaptive and non-adaptive retransmission. In Rel-8, adaptive retransmission is triggered by sending a UL grant on the DL control channel with the new data indicator (NDI) bit unchanged. Non-adaptive retransmission is triggered by sending NAK bits on the PHICH without sending UL grant on the DL control channel.

In the case Rel-10 UL MIMO, adaptive retransmission would require sending a large payload MIMO DCI format in general, even if only a single MIMO codeword is to be retransmitted. It may be beneficial to send a compact (non-MIMO) DCI format, such as DCI format 0, e.g., to conserve bandwidth needed to transmit the message. In this case, some additional information may need to be conveyed about which codeword should be retransmitted. Accordingly, various techniques are described below, wherein, a compact DCI format is used, along with a physical hybrid ARQ indication channel (PHICH) to signal codeword transmission bandwidths to a UE 120.

In some designs, the eNB 110 uses a combination of PHICH and PDCCH signaling to use compact control channel format. In an aspect, PDCCH may be considered to override any settings conveyed in the PHICH.

Assume that the UE 120 receives DCI format 4 (MIMO DCI) when in UL MIMO transmission mode. The UE 120 may follow the UL grant for controlling the UL transmission. The eNB 110 may set PHICH0=ACK, PHICH1=ACK. The UE 120 may ignore PHICH whenever DCI Format 4 is decoded. The precoder used by the UE 120 may be the same as for the previous transmission. The setting of the two fields PHICH0 and PHICH1 to the same value (ACK), as above, may be advantageous to enable a fallback mode, or a backward compatible mode, in which a UE 120 may be instructed to operate in a single antenna mode, as further explained below.

If the UE 120 does not receive UL grant, the UE 120 may follow the PHICH contents to decide about new transmission or retransmission for each codeword independently. The precoder may be the same as for the previous transmission.

If the UE 120 receives DCI format 0 when in UL MIMO transmission mode, depending on the PHICH signaling, the UE 120 may interpret the grant as follows.

In certain designs, the rules of interpretation, as listed in Table 1 may be used. In Table 1, the first column lists the possible values received in PHICH0. The second column lists the possible values received in PHICH1. The third column, having heading "Possible Interpretation," lists actions that may be performed by the UE 120 upon receiving the listed combination of PHICH0 and PHICH1.

TABLE 1

| PHICH0 | PHICH1 | Possible Interpretation |
|---|---|---|
| NAK | ACK | Suspend transmission of codeword 1 (CW1). Transmit codeword 0 (CW0). Whether CW0 is transmitted as a new transmission or retransmission may be controlled by NDI evaluated as delta (difference) relative to previous NDI for CW0. The previous transmit precoder matrix indicator (TPMI) for CW0 may be used. |
| ACK | NAK | Suspend transmission of CW0. Transmit CW1. Whether CW1 is transmitted as a new transmission or retransmission may be controlled by NDI evaluated as delta relative to previous NDI for CW1. The previous TPMI for CW1 may be used. |
| ACK | ACK | Suspend transmission of CW0. Transmit CW1. Whether CW1 is transmitted as a new transmission or retransmission may be controlled by NDI evaluated as delta relative to previous NDI for CW1. Use single antenna mode or a TxDiv scheme for transmission. |
| NAK | NAK | Suspend transmission of CW1. Transmit CW0. Whether CW0 is transmitted as a new transmission or retransmission may be controlled by NDI evaluated as delta (difference) relative to previous NDI for CW0. Use single antenna mode or a TxDiv scheme for transmission. |

In certain other designs, the rules of interpretation as shown in Table 2 may be used.

TABLE 2

| PHICH0 | PHICH1 | Possible Interpretation |
|---|---|---|
| NAK | ACK | Suspend CW1. Transmit CW0. New transmission or retransmission for CW0 may be controlled by NDI evaluated as delta relative to previous NDI for CW0. Use previous TPMI for CW0. |
| ACK | NAK | Suspend CW0. Transmit CW1. New transmission or retransmission for CW1 is controlled by NDI evaluated as delta relative to previous NDI for CW1. Use previous TPMI for CW1. |

TABLE 2-continued

| PHICH0 | PHICH1 | Possible Interpretation |
|---|---|---|
| ACK | ACK | Transmit both CW0 and CW1. New transmission or retransmission for CW0 is controlled by NDI evaluated as delta relative to previous NDI for CW0. New transmission for CW1. Use same PMI as for previous transmission |
| NAK | NAK | Transmit both CW0 and CW1. New transmission or retransmission for CW0 is controlled by NDI evaluated as delta relative to previous NDI for CW0. Retransmission for CW1. Use same PMI as for previous transmission. |

In certain other designs, the rules of interpretation as listed in Table 3, may be used.

TABLE 3

| PHICH0 | PHICH1 | Possible Interpretation |
|---|---|---|
| NAK | ACK | Suspend CW1. Transmit CW0. New transmission or retransmission for CW0 is controlled by NDI evaluated as delta relative to previous NDI for CW0. Use previous TPMI for CW0. |
| ACK | NAK | Suspend CW0. Transmit CW1. New transmission or retransmission for CW1 is controlled by NDI evaluated as delta relative to previous NDI for CW1. Use previous TPMI for CW1. |
| ACK | ACK | Disallowed, (error case) |
| NAK | NAK | Retransmit both CW0 and CW1. Ignore NDI bit. Use same TPMI as for previous transmission. |

In certain other designs, the rules of interpretation as listed in Table 4 may be used.

TABLE 4

| PHICH0 | PHICH1 | Possible Interpretation |
|---|---|---|
| NAK | ACK | Suspend CW1, transmit CW0. New transmission or retransmission for CW0 is controlled by NDI evaluated as delta relative to previous NDI for CW0. Use previous TPMI for CW0. |
| ACK | NAK | Suspend CW0, transmit CW1. New transmission or retransmission for CW1 is controlled by NDI evaluated as delta relative to previous NDI for CW1. Use previous TPMI for CW1 |
| ACK | ACK | Disallowed, (error case) |
| NAK | NAK | Disallowed, (error case) |

In order to enhance the error suppression capability with the above options, it may be assumed that when using compact DCI format in the MIMO transmission modes, the resource allocation (occupied physical resource blocks) is not changed compared to the previous transmission. However, certain other transmission parameters such as the demodulation reference signal (DM-RS) cyclic shift offset, redundancy version identification (RV-ID) may be changed.

FIG. 5 is a flow chart representation of a wireless communication methodology 500. At box 502, a first message including a first field and a second field are transmitted. The first message may be transmitted, e.g., by the eNB 110, to signal to the UE 120 acknowledgement for a plurality of codewords (e.g., CW0 and CW1). For example, the first message may be a PHICH message. In some designs, the first field and the second field may correspond to PHICH0 and PHICH1 fields, as discussed previously. At box 504, in a second message, based on the values of the first field and the second field in the first message, one of a first codeword and a second codeword to be transmitted are signaled. For example, the second message may correspond to an UL grant message and as previously discussed may signal resources for codeword(s) to be transmitted by the UE 120 in the uplink direction. As previously discussed with respect to Tables 1 to 4, the interpretation of UL grant by the UE 120 may depend on the PHICH signaling. For example, the NDI bit field may indicate whether CW0 or CW1 is to be newly transmitted or retransmitted. In some designs, the UL grant may be transmitted in a DCI format 0 message. In some designs, as previously discussed, a single antenna transmission mode (fallback operation) may be indicated in the second message. In some designs, when the values of the first field and the second field are the same (e.g., both PHICH0 and PHICH1 indicate NAK), then this combination may indicate that CW1 is to be transmitted using previously used precoder matrix TPMI.

FIG. 6 is a block diagram representation of a portion of a wireless communication apparatus 600. The module 602 is for transmitting a first message including a first field and a second field. The module 604 is for signaling, in a second message, based on values of the first field and the second field in the first message, one of a first codeword and a second codeword to be transmitted. The communication apparatus 600, the module 602 and the module 604 may further be configured to implement the previously discussed subject technology.

As discussed previously, the eNB 110 may provide acknowledgements and also allocate transmission resources to the UE 120 by transmitting the previously discussed signals. In some designs, the UE 120 may correspondingly be configured to receive the messages and interpret and use the messages as discussed herein.

FIG. 7 is a flow chart representation of a wireless communication methodology 700. At box 702, a plurality of codewords are transmitted. For example, in SU-MIMO systems, the UE 120 may transmit multiple (e.g., 2) codewords in the uplink direction. At box 704, a downlink feedback message including spatially bundled acknowledgements for the transmitted plurality of codewords is received. In some designs, based on the received feedback message, the UE 120 may decide whether or not to retransmit at least one of the codewords. For example, as previously discussed, the UE 120 may receive NAK indication from the eNB 110. Furthermore, the UE 120 may also receive NDI bits from the eNB 110, whether to retransmit a codeword or transmit a new codeword.

FIG. 8 is a block diagram representation of a portion of a wireless communication apparatus 800. The module 802 is for transmitting a plurality of codewords. The module 804 is for receiving a downlink feedback message including spatially bundled acknowledgments for the transmitted plurality of codewords. The communication apparatus 800, the module 802 and the module 804 may further implement the subject technology discussed herein.

FIG. 9 is a flow chart representation of a wireless communication methodology 900. At box 902, a first message including a first field and a second field is received. The first message may correspond to, e.g., PHICH transmitted by the eNB 110 in the downlink direction. As previously discussed, two message fields, PHICH0 and PHICH1, may be included in the transmitted PHICH signal for providing acknowledgements for multiple codewords. At box 904, one of a first codeword and a second codeword is transmitted, based on the value of the first field and the second field. For example, the decision regarding which codeword to transmit may be performed using one of the techniques previously discussed with respect to Table 1 to 4. In some designs, the transmission contents and formats of transmission may be set according to the contents of a second message received. The second message may correspond to the uplink grant (e.g., compact uplink grant) message, as discussed previously.

FIG. 10 is a block diagram representation of a portion of a wireless communication apparatus 1000. The module 1002 is for receiving a first message including a first field and a second field. The module 1004 is for transmitting, based on values of the first field and the second field in the first message, one of a first codeword and a second codeword. The transmission contents and formats may be set according to the contents of a second message received. The second message may correspond to the uplink grant (e.g., compact uplink grant) message, as discussed previously. The communication apparatus 1000 and the modules 1002 and 1004 may further implement the subject technology disclosed herein.

Figure 11:
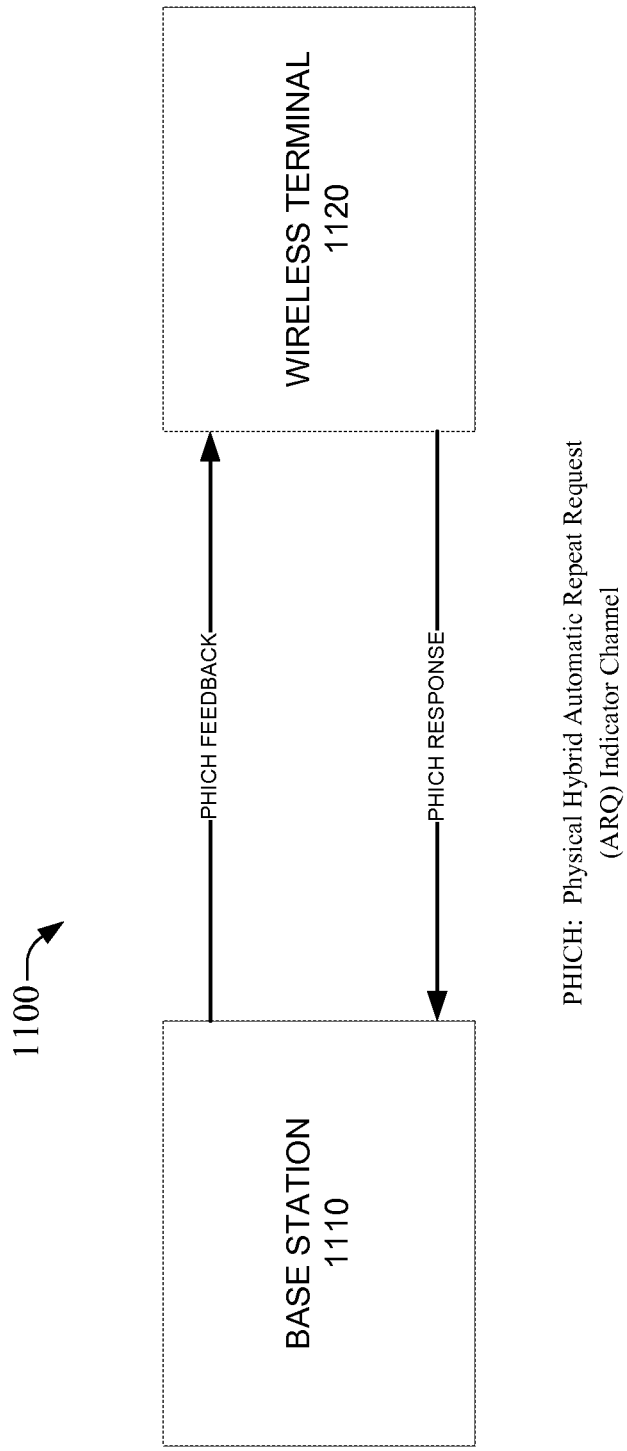
FIG. 11 is an illustration of an exemplary environment that facilitates acknowledgment bundling according to an embodiment.

Referring next to FIG. 11, an exemplary environment that facilitates acknowledgment bundling according to an embodiment is provided. As illustrated, system 1100 includes base station 1110 which is communicatively coupled to wireless terminal 1120. In an aspect, base station 1110 provides wireless terminal 1120 with PHICH feedback according to a particular feedback scheme. Wireless terminal 1120 then provides a feedback response to base station 1110 according to the particularly implemented feedback scheme. A non-exhaustive description of exemplary feedback schemes is provided below.

Figure 12:
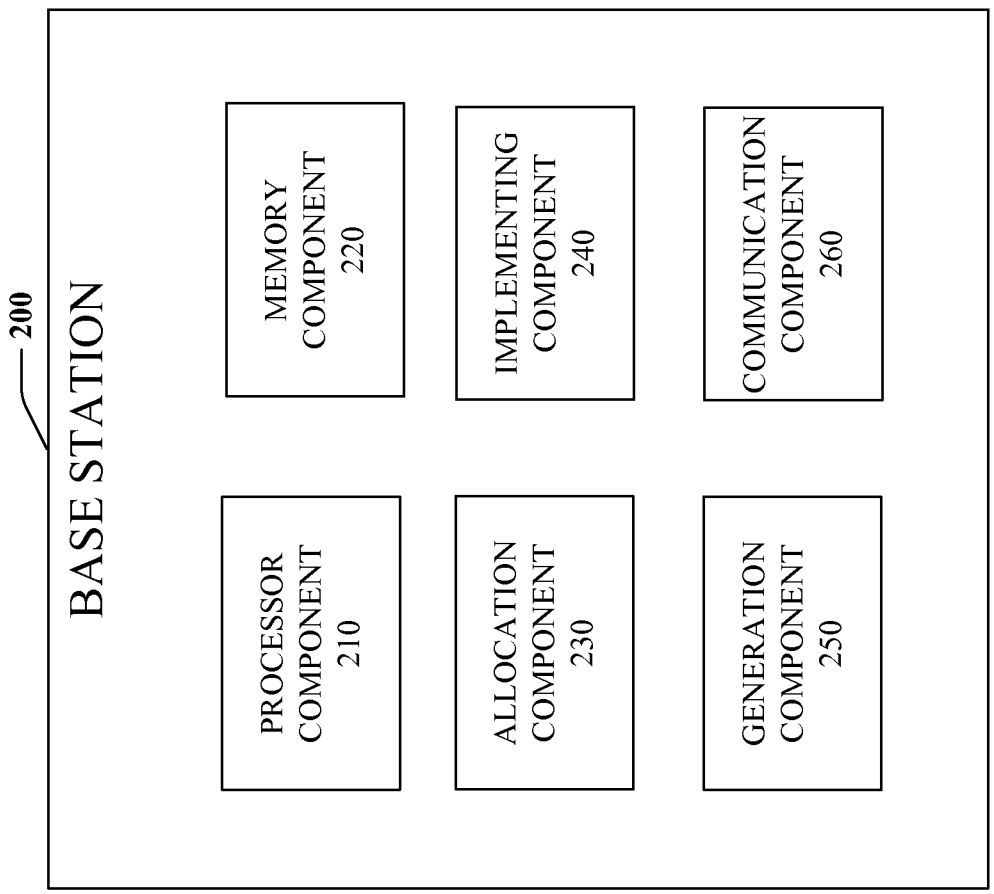
FIG. 12 is a block diagram of an exemplary base station that facilitates acknowledgment bundling according to an embodiment.

Referring next to FIG. 12, a block diagram of an exemplary base station (e.g., an eNB 110) that facilitates acknowledgment bundling according to an embodiment is provided. As shown, base station 200 may include processor component 210, memory component 220, allocation component 230, implementing component 240, generation component 250, and communication component 260.

In one aspect, processor component 210 is configured to execute computer-readable instructions related to performing any of a plurality of functions. Processor component 210 can be a single processor or a plurality of processors dedicated to analyzing information to be communicated from base station 200 and/or generating information that can be utilized by memory component 220, allocation component 230, implementing component 240, generation component 250, and/or communication component 260. Additionally or alternatively, processor component 210 may be configured to control one or more components of base station 200.

In another aspect, memory component 220 is coupled to processor component 210 and configured to store computer-readable instructions executed by processor component 210. Memory component 220 may also be configured to store any of a plurality of other types of data including data generated by either of allocation component 230, implementing component 240, generation component 250, and/or communication component 260. Memory component 220 can be configured in a number of different configurations, including as random access memory, battery-backed memory, hard disk, magnetic tape, etc. Various features can also be implemented upon memory component 220, such as compression and automatic back up (e.g., use of a Redundant Array of Independent Drives configuration).

As illustrated, base station 200 may further include allocation component 230. Within such embodiment, allocation component 230 is configured to allocate a number of Physical Hybrid Automatic Repeat Request (ARQ) Indicator Channel (PHICH) resources. For instance, allocation component 230 may be configured to allocate either one or two PHICH resources for ACKing/NACKing the aforementioned two codewords in UL MIMO.

In another aspect, base station 200 further includes implementing component 240 and generation component 250. Within such embodiment, implementing component 240 is configured to implement a feedback scheme that maps a set of feedback transmissions to a set of feedback responses, whereas generation component 250 is configured to generate feedback based on the feedback scheme. For this particular embodiment, the feedback generated by generation component 250 is associated with an acknowledgment of at least one codeword. In an aspect, it should be noted that generation component 250 may be configured to determine whether to accompany such feedback with an uplink grant, depending on the particular feedback scheme implemented by implementing component 240.

In yet another aspect, communication component 260 is coupled to processor component 210 and configured to interface base station 200 with external entities. For instance, communication component 260 may be configured to transmit the feedback generated by generation component 250 to any of a plurality of wireless terminals via the PHICH resources allocated by allocation component 230. Communication component 260 may also be configured to transmit configuration data directing a wireless terminal to provide feedback responses according to the feedback scheme implemented by implementing component 240.

Figure 13:
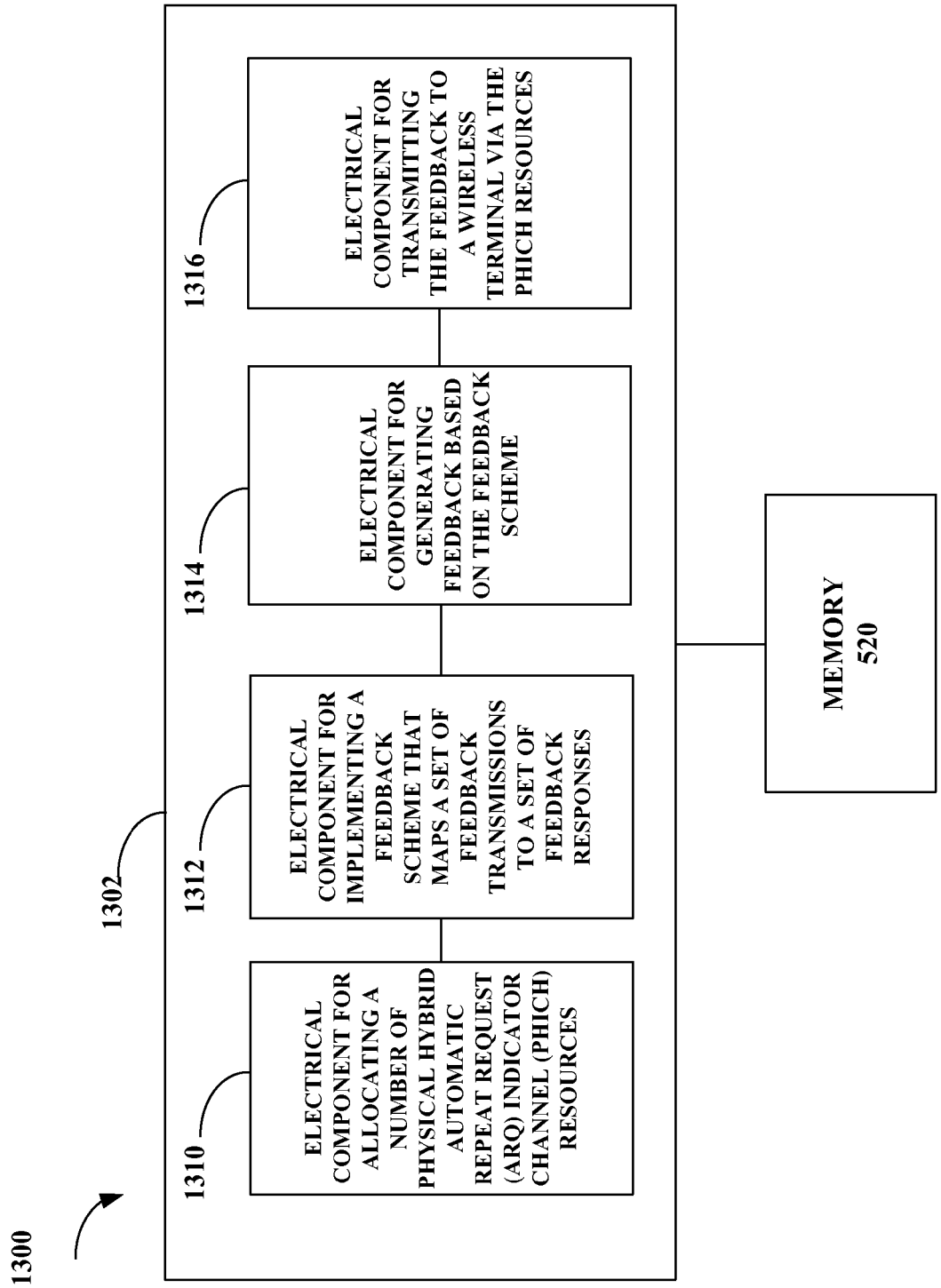
FIG. 13 is an illustration of an exemplary coupling of electrical components that facilitates acknowledgment bundling according to an embodiment.

Referring next to FIG. 13, illustrated is a system 1300 that facilitates acknowledgment bundling according to an embodiment. System 1300 can reside within a base station (e.g., an eNB), for instance. System 1300 includes functional blocks that can represent functions implemented by a processor, software, or combination thereof (e.g., firmware), wherein system 1300 includes a logical grouping 1302 of electrical components that can act in conjunction. As illustrated, logical grouping 1302 can include an electrical component for allocating a number of PHICH resources 1310, as well as an electrical component for implementing a feedback scheme that maps a set of feedback transmissions to a set of feedback responses 1312. Logical grouping 1302 can also include an electrical component for generating feedback based on the feedback scheme 1314. Further, logical grouping 1302 can include an electrical component for transmitting the feedback to a wireless terminal via the PHICH resources 1316. Additionally, system 1300 can include a memory 1320 that retains instructions for executing functions associated with electrical components 1310, 1312, 1314, and 1316, wherein any of electrical components 1310, 1312, 1314, and 1316 can exist either within or outside memory 1320.

It will be appreciated that, in one aspect, the flexible use of the compact DCI format in MIMO transmission modes is disclosed. By utilizing information conveyed on PHICH, no new codepoints need to be added in the compact DCI format(s). Although the possibility is not excluded to carry some of the PHICH information as additional codepoints in the compact DCI format.

Furthermore, it will be appreciated that, in certain designs, a fallback mode, in which the UE 120 is instructed to operate in a single transmission antenna mode, is provided. The compact, single codeword signaling may be advantageous during the time when a UE 120 and the eNB 110 go out of synch during transition between the UE's operation using a single transmit antenna or a multi-antenna transmission mode.

It will be appreciated that, from the perspective of a base station, several techniques for transmitting a downlink feedback message for a plurality of codewords received in the upstream direction are disclosed. In some designs, the downlink feedback message is transmitted by spatially bundling the acknowledgements for the received plurality of codewords. In some designs, an uplink grant message is also transmitted. In some designs, the uplink grant message includes a MIMO DCI message.

It will also be appreciated that, in some designs, the spatial bundling may be performed in a plurality of PHICH channels transmitted in the downlink direction. In one aspect, the spatial bundling may reduce the amount of overhead bits required to transmit individual acknowledgements. In another aspect, the same amount of downstream transmission resources may be used for acknowledging reception of codewords from multiple users.

It will further be appreciated that several techniques for using a new data indicator field are also disclosed. In some designs, a first message including a first field and a second field are transmitted in the downlink direction. Based on the value of the first field and the second field, either a first codeword or a second codeword is signaled in a second message that is transmitted in the downlink direction.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean serving as an example, instance, or illustration. Any aspect or design described herein as "exemplary" is not necessarily to be construed as preferred or advantageous over other aspects or designs.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein (e.g., identifiers, assigners, transmitters and allocators), may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A wireless communication method, comprising:
receiving a plurality of codewords;
transmitting a downlink feedback message by spatially bundling acknowledgments for the received plurality of codewords in a plurality of Physical Hybrid Automatic Repeat Request (ARQ) Indicator Channels (PHICH); and
transmitting configuration data in a Physical Downlink Control Channel (PDCCH) accompanying the downlink feedback message in the PHICH to configure a wireless terminal to provide an uplink feedback response, wherein, based on the configuration data including information related to a downlink control information format for signaling in the PDCCH, one of: the signaling in the PDCCH overrides any settings conveyed by the PHICH when the signaling in the PDCCH uses a large payload downlink control information format, or the signaling in the PDCCH is interpreted using the downlink feedback message in the PHICH when the signaling in the PDCCH uses a compact payload downlink control information format, wherein the signaling in the PDCCH is interpreted to configure the wireless terminal to operate in a single antenna mode when the downlink feedback message in the PHICH acknowledges the plurality of codewords are received.

2. The method of claim 1, further including:
transmitting an accompanying uplink grant message.

3. The method of claim 2, wherein the uplink grant message includes a multi-input-multi-output (MIMO) downlink control information (DCI) message.

4. The method of claim 2, wherein the uplink grant message includes a single transport block (TB) grant downlink control information (DCI) message.

5. A wireless communication apparatus, comprising:
means for receiving a plurality of codewords;
means for transmitting a downlink feedback message by spatially bundling acknowledgments for the received plurality of codewords in a plurality of Physical Hybrid Automatic Repeat Request (ARQ) Indicator Channels (PHICH); and
means for transmitting configuration data in a Physical Downlink Control Channel (PDCCH) accompanying the downlink feedback message in the PHICH to configure a wireless terminal to provide an uplink feedback response, wherein, based on the configuration data including information related to a downlink control information format for signaling in the PDCCH, one of: the signaling in the PDCCH overrides any settings conveyed by the PHICH when the signaling in the PDCCH uses a large payload downlink control information format, or the signaling in the PDCCH is interpreted using the downlink feedback message in the PHICH when the signaling in the PDCCH uses a compact payload downlink control information format, wherein the signaling in the PDCCH is interpreted to configure the wireless terminal to operate in a single antenna mode when the downlink feedback message in the PHICH acknowledges the plurality of codewords are received.

6. The apparatus of claim 5, further including:
means for transmitting an accompanying uplink grant message.

7. The apparatus of claim 6, wherein the uplink grant message includes a multi-input-multi-output (MIMO) downlink control information (DCI) message.

8. The apparatus of claim 6, wherein the uplink grant message includes a single transport block (TB) grant downlink control information (DCI) message.

9. A non-transitory computer-readable, non-volatile storage medium storing computer-executable instructions, the instructions comprising code for:
receiving a plurality of codewords;
transmitting a downlink feedback message by spatially bundling acknowledgments for the received plurality of codewords in a plurality of Physical Hybrid Automatic Repeat Request (ARQ) Indicator Channels (PHICH); and
transmitting configuration data in a Physical Downlink Control Channel (PDCCH) accompanying the downlink feedback message in the PHICH to configure a wireless terminal to provide an uplink feedback response, wherein, based on the configuration data including information related to a downlink control information format for signaling in the PDCCH, one of: the signaling in the PDCCH overrides any settings conveyed by the PHICH when the signaling in the PDCCH uses a large payload downlink control information format, or the signaling in the PDCCH is interpreted using the downlink feedback message in the PHICH when the signaling in the PDCCH uses a compact payload downlink control information format, wherein the signaling in the PDCCH is interpreted to configure the wireless terminal to operate in a single antenna mode when the downlink feedback message in the PHICH acknowledges the plurality of codewords are received.

10. An apparatus for wireless communication, comprising:
a memory; and
a processor coupled to the memory and configured to:
receive a plurality of codewords;
transmit a downlink feedback message by spatially bundling acknowledgments for the received plurality of codewords in a plurality of Physical Hybrid Automatic Repeat Request (ARQ) Indicator Channels (PHICH); and
transmit configuration data in a Physical Downlink Control Channel (PDCCH) accompanying the downlink feedback message in the PHICH to configure a wireless terminal to provide an uplink feedback response, wherein, based on the configuration data including information related to a downlink control information format for signaling in the PDCCH, one of: the signaling in the PDCCH overrides any settings conveyed by the PHICH when the signaling in the PDCCH uses a large payload downlink control information format, or the signaling in the PDCCH is interpreted using the downlink feedback message in the PHICH when the signaling in the PDCCH uses a compact payload downlink control information format, wherein the signaling in the PDCCH is interpreted to configure the wireless terminal to operate in a single antenna mode when the downlink feedback message in the PHICH acknowledges the plurality of codewords are received.

11. A wireless communication method, comprising:
transmitting a plurality of codewords;
receiving a downlink feedback message including spatially bundled acknowledgments for the transmitted plurality of codewords in a plurality of Physical Hybrid Automatic Repeat Request (ARQ) Indicator Channels (PHICH); and
receiving configuration data in a Physical Downlink Control Channel (PDCCH) accompanying the downlink feedback message in the PHICH to provide an uplink feedback response, wherein, based on the configuration data including information related to a downlink control information format for signaling in the PDCCH, one of: the signaling in the PDCCH overrides any settings conveyed by the PHICH when the signaling in the PDCCH uses a large payload downlink control information format, or the signaling in the PDCCH is interpreted using the downlink feedback message in the PHICH when the signaling in the PDCCH uses a compact payload downlink control information format, wherein the signaling in the PDCCH is interpreted to enable a single antenna mode when the downlink feedback message in the PHICH acknowledges the plurality of codewords are received.

12. The method of claim 11, further including:
determining whether or not to retransmit at least one of the plurality of codewords based on the received downlink feedback message.

13. The method of claim 11, further including:
receiving an accompanying uplink grant message.

14. The method of claim 13, wherein the uplink grant message includes a multi-input-multi-output (MIMO) downlink control information (DCI) message.

15. The method of claim 13, wherein the uplink grant message includes a single transport block (TB) grant downlink control information (DCI) message.

16. The method of claim 15, further including:
retransmitting, when one of the spatially bundled acknowledgements includes a NAK, a corresponding codeword using a transmission format indicated in the received uplink grant message.

17. The method of claim 11, further including:
determining whether or not to retransmit at least one of the plurality of codewords based on the received downlink feedback message.

18. The method of claim 13, wherein the uplink grant message includes a multi-input-multi-output (MIMO) downlink control information (DCI) message.

19. The method of claim 13, wherein the uplink grant message includes a single transport block (TB) grant downlink control information (DCI) message.

20. The method of claim 19, further including:
retransmitting, when one of the spatially bundled acknowledgements includes a NAK, a corresponding codeword using a transmission format indicated in the received uplink grant message.

21. A wireless communication apparatus, comprising:
means for transmitting a plurality of codewords;
means for receiving a downlink feedback message including spatially bundled acknowledgments for the transmitted plurality of codewords in a plurality of Physical Hybrid Automatic Repeat Request (ARQ) Indicator Channels (PHICH); and
means for receiving configuration data in a Physical Downlink Control Channel (PDCCH) accompanying the downlink feedback message in the PHICH to provide an uplink feedback response, wherein, based on the configuration data including information related to a downlink control information format for signaling in the PDCCH, one of: the signaling in the PDCCH overrides any settings conveyed by the PHICH when the signaling in the PDCCH uses a large payload downlink control information format, or the signaling in the PDCCH is interpreted using the downlink feedback message in the PHICH when the signaling in the PDCCH uses a compact payload downlink control information format, wherein the signaling in the PDCCH is interpreted to enable a single antenna mode when the downlink feedback message in the PHICH acknowledges the plurality of codewords are received.

22. The apparatus of claim 21, further including:
means for receiving an accompanying uplink grant message.

23. The apparatus of claim 22, wherein the uplink grant message includes a multi-input-multi-output (MIMO) downlink control information (DCI) message.

24. The apparatus of claim 22, wherein the uplink grant message includes a single transport block (TB) grant downlink control information (DCI) message.

25. The apparatus of claim 24, further including:
means for retransmitting, when one of the spatially bundled acknowledgements includes a NAK, a corresponding codeword using a transmission format indicated in the received uplink grant message.

26. The apparatus of claim 21, further including:
means for determining whether or not to retransmit at least one of the plurality of codewords based on the received downlink feedback message.

27. The apparatus of claim 22, further including:
means for receiving an accompanying uplink grant message.

28. The apparatus of claim 27, wherein the uplink grant message includes a multi-input-multi-output (MIMO) downlink control information (DCI) message.

29. The apparatus of claim 27, wherein the uplink grant message includes a single transport block (TB) grant downlink control information (DCI) message.

30. The apparatus of claim 29, further including:
means for retransmitting, when one of the spatially bundled acknowledgements includes a NAK, a corresponding codeword using a transmission format indicated in the received uplink grant message.

31. A non-transitory computer-readable, non-volatile storage medium storing computer-executable instructions, the instructions comprising code for:
transmitting a plurality of codewords;
receiving a downlink feedback message including spatially bundled acknowledgments for the transmitted plurality of codewords in a plurality of Physical Hybrid Automatic Repeat Request (ARQ) Indicator Channels (PHICH); and
receiving configuration data in a Physical Downlink Control Channel (PDCCH) accompanying the downlink feedback message in the PHICH to provide an uplink feedback response, wherein, based on the configuration data including information related to a downlink control information format for signaling in the PDCCH, one of: the signaling in the PDCCH overrides any settings conveyed by the PHICH when the signaling in the PDCCH uses a large payload downlink control information format, or the signaling in the PDCCH is interpreted using the downlink feedback message in the PHICH when the signaling in the PDCCH uses a compact payload downlink control information format, wherein the signaling in the PDCCH is interpreted to enable a single antenna mode when the downlink feedback message in the PHICH acknowledges the plurality of codewords are received.

32. An apparatus for wireless communication, comprising:
a memory; and
a processor coupled to the memory and configured to:
transmit a plurality of codewords;
receive a downlink feedback message including spatially bundled acknowledgments for the transmitted plurality of codewords in a plurality of Physical Hybrid Automatic Repeat Request (ARQ) Indicator Channels (PHICH); and receive configuration data in a Physical Downlink Control Channel (PDCCH) accompanying the downlink feedback message in the PHICH to provide an uplink feedback response, wherein, based on the configuration data including information related to a downlink control information format for signaling in the PDCCH, one of: the signaling in the PDCCH overrides any settings conveyed by the PHICH when the signaling in the PDCCH uses a large payload downlink control information format, or the signaling in the PDCCH is interpreted using the downlink feedback message in the PHICH when the signaling in the PDCCH uses a compact payload downlink control information format, wherein the signaling in the PDCCH is interpreted to enable a single antenna mode when the downlink feedback message in the PHICH acknowledges the plurality of codewords are received.

* * * * *